MAGNETIC MEMORY ELEMENT HAVING A FILM OF NONMAGNETIC ELECTRICALLY CONDUCTIVE MATERIAL THEREABOUT

Filed Oct. 26, 1966 2 Sheets-Sheet 1

3,508,216

MAGNETIC MEMORY ELEMENT HAVING A FILM OF NONMAGNETIC ELECTRICALLY CONDUCTIVE MATERIAL THEREABOUT

Toshihiro Hoshi, Kawasaki-shi, Japan, assignor to Fujitsu Limited, Kawasaki, Japan, a corporation of Japan Filed Oct. 26, 1966, Ser. No. 589,723
Claims priority, application Japan, Oct. 29, 1965, 40/66,450
Int. Cl. G11c 11/14, 17/00
U.S. Cl. 340—174 20 Claims

ABSTRACT OF THE DISCLOSURE

Each memory conductor of a thin film memory device has a film of magnetic material on the surface area thereof and a film of non-magnetic electrically conductive material of less than 4 microns thickness on the film of magnetic material.

Description of the invention

The present invention relates to a thin film memory device. More particularly, the invention relates to a magnetic thin film memory device.

Magnetic thin films are utilized as memory elements in high speed electronic computers, or electronic exchanges, since they considerably shorten read-in and read-out time. The magnetic wires of such memory elements may be readily manufactured with facility by a number of suitable processes such as, for example, electrodeposition and wire drawing. The memory elements have a large capacity, which also suits them for use in electronic computers or electronic exchanges.

The magnetic wires of the memory elements may each comprise an electrically conductive wire having a coating of magnetic material on its surface area. The magnetic material has a high magnetic permeability and adheres closely to the conductive wire in a manner which forms a closed magnetic circuit. Thus, when the magnetic wire operates not only as the memory conductor of the memory element, but also to transmit signals ,the inductance becomes considerably larger than if the magnetic material were absent from the electrical conductor. This results in a decrease in the signal propagation speed. Furthermore, the electrical resistance of the magnetic material portion of the magnetic wire is greater than that of the electrical conductor portion thereof. Thus, when a storage information signal current having a high frequency component flows through the magnetic wire, such current does not flow at the surface of said magnetic wire due to the skin effect, so that there is a great attenuation of current or signals passing through said magnetic wire.

The principal object of the present invention is to provide a new and improved magnetic thin film memory device. The memory device of the present invention provides a delayed speed of rotation of the magnetization of the magnetic wires, increased signal or storage information signal current propagation speed and decreased attenuation of signals or storage information signal current transferred by the magnetic wires. The memory device of the present invention provides magnetic wires having a film of magnetic material which is protected from deterioration, corrosion or oxidation. The memory device of the present invention is effective, efficient and reliable in operation and is of simple structure.

In accordance with the present invention, a thin film memory device comprises a matrix arrangement having a plurality of memory conductors, a plurality of word conductors positioned in determined relation to each other and each positioned in determined relation to the others and a plurality of magnet means each positioned in operative proximity with a corresponding one of the memory conductors and a corresponding one of the word conductors at a determined area thereof. Each of the memory conductors has a surface area and each of the memory conductors is in operative proximity with each of the word conductors at determined areas, and each of the word conductors is in operative proximity with each of the memory conductors at the determined areas. In accordance with the invention, a film of magnetic material is coated on the surface area of each of the memory conductors and a film of non-magnetic electrically conductive material is coated on the film of magnetic material on each of the memory conductors.

The film of magnetic material may cover the entire surface area or less than the entire surface area of each of the memory conductors. The non-magnetic electrically conductive material comprises one of the group consisting of gold, silver and copper or an alloy of at least two of the group consisting of gold, silver and copper.

In order that the present invention may be readily carried into effect, it will now be described with reference to the accompanying drawings, wherein.

Figure 1:
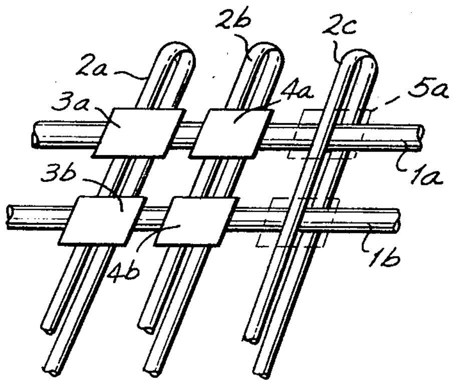
FIG. 1 is a perspective view of a portion of an embodiment of a memory matrix which may utilize the magnetic thin film memory device of the present invention.

In FIG. 1, a memory matrix comprises a plurality of memory conductors *1a* and *1b* coplanarly positioned in parallel, equidistant relation to each other. Although only two memory conductors are shown in FIG. 1, a great number of memory conductors may be utilized.

A plurality of word conductors *2a*, *2b* and *2c* are provided at right angles to the memory conductors *1a* and *1b* and may comprise a great number rather than the three shown in FIG. 1. Each of the word conductors *2a*, *2b* and *2c* is of elongated, narrow, U configuration, so that each of said conductors has two principal portions or arms, one extending on one side of each of the memory conductors and the other extending on the other side of each of said memory conductors. Thus, the two arms of each word conductor *2a*, *2b* and *2c* are spaced from each other by at least the diameter of the memory conductors *1a* and *1b* and are parallel to each other and coplanar in a plane at right angles to the plane of the memory conductors.

The principal portions or arms of each of the word conductors on one side of the memory conductors are coplanarly positioned in parallel, equidistant relation to each other in a plane parallel to the plane of the memory conductors. The principal portions or arms of each of the word conductors on the other side of the memory conductors are coplanarly positioned in parallel, equidistant relation to each other in a plane parallel to the plane of the memory conductors.

Each of the memory conductors *1a* and *1b* is thus in operative proximity with each of the word conductors *2a*, *2b* and *2c* at determined areas and each of said word conductors is in operative proximity with each of said memory conductors at said determined areas. A plurality of magnets *3a* and *3b* and *4a* and *4b* are provided, only four of which are shown. Each of the magnets *3a*, *3b*, *4a*, *4b* is positioned in operative proximity with a corresponding one of the memory conductors 1*a* and 1*b* and a corresponding one of the word conductors 2*a*, 2*b* and 2*c* at a determined area thereof.

The magnet 3*a* is thus positioned in operative proximity with the memory conductor 1*a* and the word conductor 2*a* at the intersection thereof. The magnet 3*b* is positioned in operative proximity with the memory conductor 1*b* and the word conductor 2*a* at the intersection thereof. The magnet 4*a* is positioned in operative proximity with the memory conductor 1*a* and the word conductor 2*b* at the intersection thereof. The magnet 4*b* is positioned in operative proximity with the memory conductor 1*b* and the word conductor 2*b* at the intersection thereof.

In the memory matrix of FIG. 1, data is stored by the magnets 3*a*, 3*b*, 4*a*, 4*b*. The magnets 3*a*, 3*b*, 4*a*, 4*b* may comprise, for example, small sized magnets affixed to a support plate (not shown). The data to be stored is indicated by the magnetization condition of the magnets on the support plate. Data may be read in by removing the support plate from the memory device and varying the magnetization condition of the magnets supported thereon in accordance with the data to be read in.

Each of the word conductors 2*a*, 2*b*, 2*c* comprises copper and preferably comprises a copper belt having a substantially rectangular cross section. Each of the memory conductors 1*a*, 1*b* comprises an electrical conductor having a surface area with a film of magnetic material of any suitable type on the surface area covering all or less than said entire surface area. Data is read in by magnetizing or demagnetizing each of the magnets 3*a*, 3*b*, 4*a*, 4*b* in accordance with the data to be read in. Data is read-out by supplying a readout current to the word conductors 2*a*, 2*b*, 2*c*.

If, for example, the magnet 5*a* at the intersection of the memory conductor 1*a* and the word conductor 2*c* is magnetized in a manner whereby the magnetic field produced at the intersection by the read-out current flowing through the word conductor 2*c* has the same direction as the magnetic field of said magnet 5*a*, and if the magnetic field of the magnet 5*a* is of sufficient intensity to saturate the magnetic film of the memory conductor 1*a*, then, when said readout current flows through the word conductor 2*c*, the magnetization condition of said magnetic film does not change and no output voltage is produced in the memory conductor 1*a*.

If the magnet 5*a* is demagnetized and a suitable direct current flows through the conductor of the memory conductor 1*a* to produce magnetization of the magnetic film of said memory conductor in a circumferential direction around said memory conductor, the magnetic field produced in said memory conductor by the read-out current in the word conductor 2*c*, which has a direction substantially coincident with the axis of said memory conductor, shifts the circumferentially directed magnetic field to the axial direction. The shift in direction of the magnetic field of the memory conductor 1*a* causes a variation in the amount of magnetic flux which interlinks said memory conductor, so that an output voltage is produced in said memory conductor. The production of an output voltage in a memory conductor is thus dependent upon the condition of magnetization of the corresponding magnet.

If the aforedescribed memory device is to have a great storage capacity, the memory conductors 1*a* and 1*b* must be extremely long, so that it takes a long time to propagate the output voltage from one end of the memory conductor to the other and it takes a long time to detect the output voltage. If it takes a long period of time for the output voltage to propagate, the time period between the read-out current flow in the word conductor and the provision of the output voltage at the end of the memory conductor at which said output voltage is detected depends upon the distance from said end of the point on the memory conductor at which said output voltage is initially produced. If the time period between the read-out current flow in the word conductor and the provision of the output voltage at the end of the memory conductor at which said output voltage is detected is longer than the period of the said output voltage, it is difficult to detect such output voltage.

Figure 2:
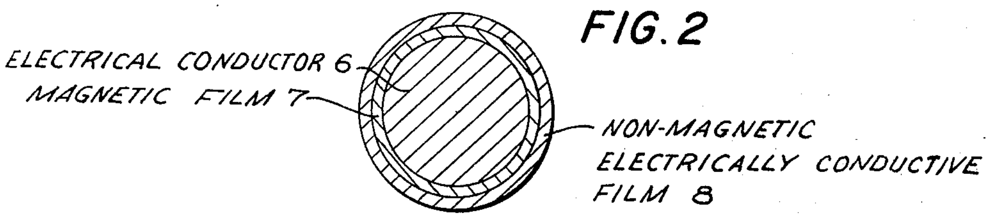
FIG. 2 is a cross-sectional view of an embodiment of a magnetic wire of the thin film memory device of the present invention.

The aforedescribed difficulty in detection of the output voltage is obviated by the memory conductor of the present invention. In accordance with the present invention, a memory conductor utilized in the memory matrix of FIG. 1 comprises, as shown in FIG. 2, an electrical conductor 6 of any suitable electrically conductive material having a surface area. The electrical conductor 6 may comprise a usual type of circular cross-sectioned wire with a substantially cylindrical surface area.

A film 7 of magnetic material is on the surface area of the electrical conductor 6. The magnetic material 7 may comprise any suitable magnetic material and may cover the entire surface area of the electrical conductor 6 or it may cover less than said entire surface area. In accordance with the invention, a film 8 of non-magnetic, electrically conductive material is on the film 7 of magnetic material on the memory conductor.

The non-magnetic, electrically conductive film 8 may comprise either gold, silver or copper or an alloy of gold and silver, gold and copper, silver and copper or gold, silver and copper.

The non-magnetic, electrically conductive film 8 considerably increases the speed of signal propagation or transmission over the speed of signal propagation or transmission in a memory conductor without said film. Furthermore, the speed at which the magnetization direction of the memory conductor shifts or rotates may be controlled by the conductive film 8. Control of the direction of magnetization controls the period of the output voltage and thereby obviates difficulties in detection of the output voltage.

In a memory conductor without the conductive film 8, attenuation of signals increases with the length of said memory conductor, so that the output voltage at the end of the memory conductor at which said output voltage is detected varies with the distance of said end from the point on the memory conductor at which said output voltage is initially produced, the longer said distance the smaller said output voltage at said end. This creates considerable difficulties in distinguishing the output voltage from the noise. In the memory conductor of the present invention with the conductive film 8, however, signal attenuation is considerably reduced, so that the variation in output voltage between the end of the memory conductor at which said output voltage is detected and the point on the memory conductor at which said output voltage is initially produced is considerably reduced and said output voltage is more readily distinguished from the noise.

Figure 3:
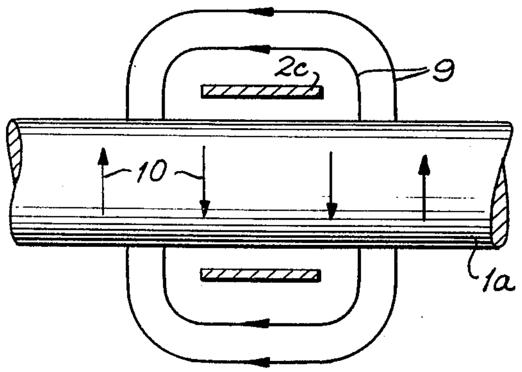
FIG. 3 is a view, partly in section, of a portion of a magnetic wire and a word conductor of the magnetic thin film memory device of the present invention.

FIG. 3 aids in explaining the operation of the memory device of the present invention. When the magnet 5*a* (not shown in FIG. 3) is demagnetized and data is to be read out from the memory conductor 1*a*, the magnetization of the magnetic film 7 (FIG. 2) of said memory conductor is ordinarily directed in a circumferential direction by the flow of a direct current through said memory conductor. Thus, when a read-out current flows through the word conductor 2*c* so that a magnetic field having a direction substantially coincident with the axis of the memory conductor is impressed upon said memory conductor, the circumferentially directed magnetic field begins to shift or rotate to the axial direction under the influence of the magnetic field impressed by the read-out current in said word conductor.

The magnetic flux in the closed magnetic circuit in the circumferential direction is shifted through the conductive film 8 and the conductor 6 (FIG. 2) of the memory conductor 1*a*, when the magnetic field shifts from the circumferential to the axial direction and is as shown at 9. The magnetic flux 9 then interlinks the conductor 6 and the conductive film 8 (FIG. 2) of the memory conductor 1a and produces an induced electromotive force which in turn produces an electric current 10 in said memory conductor. The current 10 produces a magnetic field in a direction which reduces the magnetic flux 9. That is, the magnetic field produced by the current 10 has a direction which is such that it impedes the shifting or rotation of the magnetization of the memory conductor 1a and thereby decreases the rate of such shifting or rotating. The rate of the shifting or rotation of the magnetization of the memory conductor 1a is also varied by the read-out condition of the word conductors, but it may be controlled by variation of the thickness and electrical conductivity of the conductive film 8.

When storage information signal current is transmitted or propagated through a memory conductor having a magnetic film 7 and a conductive film 8 (FIG. 2), said current flows through the central conductor 6 (FIG. 2) of said memory conductor and said magnetic film and said conductive film. Since the central conductor 6 has the largest cross-sectional area and a small electrical resistance, the current flows through said central conductor more readily than through the magnetic film 7 or the conductive film 8. However, since the magnetic film 7 has a high magnetic permeability and provides a closed magnetic circuit around the central conductor 6, there is a large inductance in said central conductor, so that there is a large impedance in said central conductor at the high frequency of the storage information signal current. The rate of shifting or rotation of the magnetization of the memory conductor of the present invention is slower, however, than said rate when there is no conductive film 8. This decreases or reduces the magnetic permeability at the high frequency to a small magnitude, so that there is a small inductance in the central conductor 6 of the memory conductor of the present invention.

The electrical resistance of the magnetic film 7 is large, so that only a small ringing current flows through said magnetic film. The conductive film 8 is surrounded by air and electrical insulation, each of which has a low magnetic permeability, so that the inductance in said conductive film is small and the high frequency component of the ringing signal flows through said conductive film. Thus, when the magnetic film 7 is covered by the conductive film 8, the attenuation of the storage information signal current is reduced to a small level. Furthermore, since the inductance is small compared to the high frequency component, as hereinbefore discussed, the speed of propagation or transmission of the signal is high.

Figure 4:
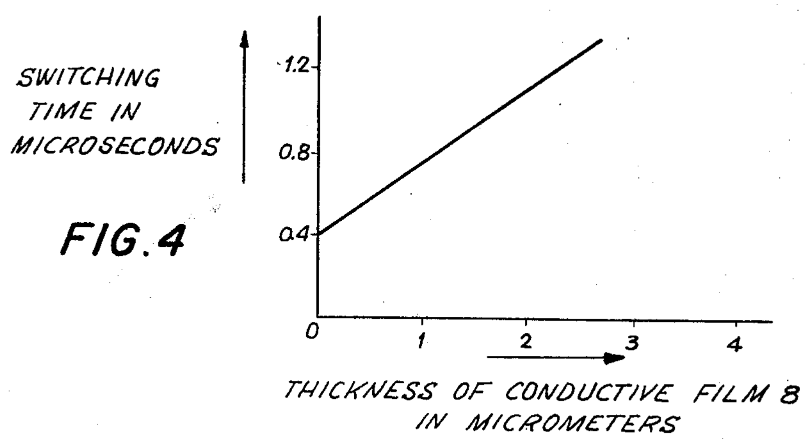
FIGS. 4, 5 and 6 are graphical presentations of the characteristics of the magnetic wire of the present invention and of known types of magnetic wire.
Figure 5:
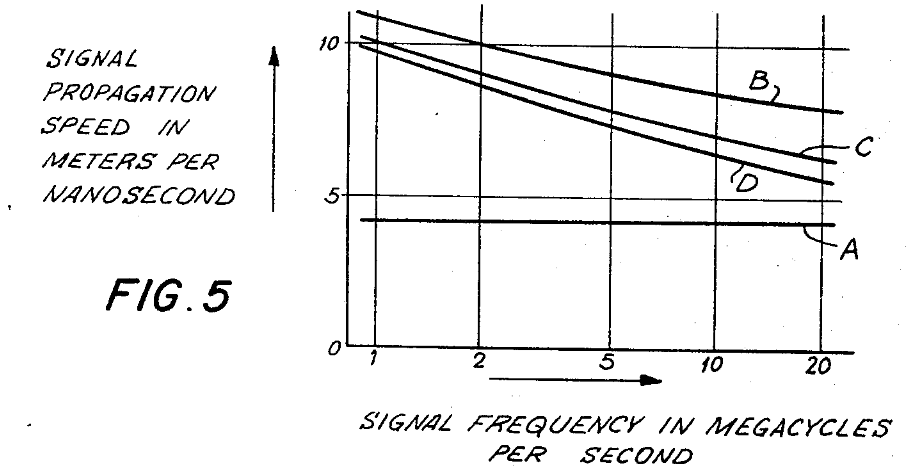
Figure 6:
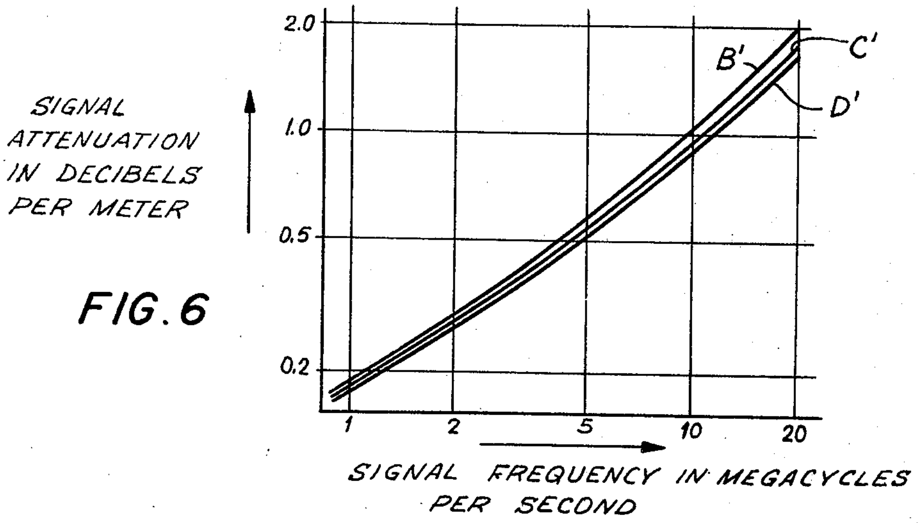

FIGS. 4, 5 and 6 illustrate characteristics of the memory conductor or magnetic wire of the present invention and of known types of memory conductor or magnetic wire. In FIGS. 4, 5 and 6, the central conductor such as, for example, the conductor 6 of FIG. 2, comprises hard-drawn copper wire of 0.08$\phi$, the magnetic film such as, for example, the magnetic film 7 of FIG. 2, comprises a Permalloy having a 3 micron thickness and electrodeposited on said central conlductor, and the conductive film such as, for example, the conductive film 8 of FIG. 2, comprises copper electrodeposited on said magnetic film. The characteristics of the memory conductor are almost the same when gold, silver, a copper and gold alloy, a copper and silver alloy, a silver and gold alloy, or a copper, gold and silver alloy is utilized as the conductive film 8 instead of copper.

FIG. 4 illustrates the switching characteristics of a memory conductor of the present invention having a magnetic film 2 micrometers thick. In FIG. 4, the abscissa represents the thickness of the conductive film 8 in micrometers and the ordinate represents the switching time of the memory device in microseconds. As illustrated in FIG. 4, the switching time varies in direct proportion with the thickness of the conductive film 8.

FIG. 5 illustrates the propagation or transmission speed characteristic of a copper wire devoid of a magnetic film or a conductive film, a memory conductor with a magnetic film but devoid of a conductive film and two memory conductors of the present invention. In FIG. 5, the abscissa represents the signal frequency in megacycles per second and the ordinate represents the signal propagation speed in meters per nanosecond.

In FIG. 5, curve A is that of a copper wire devoid of magnetic film or conductive film. Curve B of FIG. 5 is that of a memory conductor with a magnetic film, but devoid of a conductive film. In FIG. 5, curve C is that of a memory conductor of the present invention with a conductive film 8 having a thickness of 0.5 micron and curve D is that of a memory conductor of the present invention with a conductive film 8 having a thickness of 1.0 micron. As illustrated in FIG. 5, the signal propagation speed varies inversely with the signal frequency, except for a mere copper conductor as shown in curve A.

FIG. 6 illustrates the attenuation characteristic of a memory conductor with a magnetic film but devoid of a conductive film and two memory conductors of the present invention. In FIG. 6, the abscissa represents the signal frequency in megacycles per second and the ordinate represents the signal attenuation in decibels per meter.

In FIG. 6, curve B' is that of a memory conductor with a magnetic film, but devoid of a conductive film. Curve C' of FIG. 6 is that of a memory conductor of the present invention with a conductive film 8 having a thickness of 0.5 micron and curve D' is that of a memory conductor of the present invention with a conductive film 8 having a thickness of 1.0 micron. As illustrated in FIG. 6, the signal attenuation varies directly with the signal frequency; the attenuation in the memory conductors of the present invention being less than in the known type of memory conductor.

The principle of the present invention is applicable to a twister memory or a general magnetic wire memory utilized as a temporary memory. The memory conductor of the present invention increases the storage capacity of a memory device considerably.

While the invention has been described by means of specific examples and in a specific embodiment, I do not wish to be limited thereto, for obvious modifications will occur to those skilled in the art without departing from the spirit and scope of the invention.

I claim:

1. In a thin film memory device comprising a matrix arangement having a plurality of memory conductors, a plurality of word conductors positioned in determined relation to each other and each positioned in determined relation to the others, each of said memory conductors having a surface area, each of said memory conductors being in operative proximity with each of said word conductors at determined areas and each of said word conductors being in operative proximity with each of said memory conductors at said determined areas, a single film of magnetic material on each of said memory conductors and a single film of non-magnetic electrically conductive material of less than 4 microns thickness on each of said memory conductors.

2. In a thin film memory device as claimed in claim 1, wherein said film of magnetic material covers the entire surface area of each of said memory conductors.

3. In a thin film memory device as claimed in claim 1, wherein said film of magnetic material covers less than the entire surface area of each of said memory conductors.

4. In a thin film memory device as claimed in claim 1, wherein said non-magnetic electrically conductive material comprises one of the group consisting of gold, silver, copper and aluminum.

5. In a thin film memory device as claimed in claim 1, wherein said non-magnetic electrically conductive material comprises an alloy of at least two of the group consisting of gold, silver and copper.

6. In a thin film memory device as claimed in claim 1, wherein each of said memory conductors is of substantially circular cross section and each of said word conductors is of substantially elongated U configuration having a pair of spaced arms and said memory conductors extend between the arms of each of said word conductors.

7. In a thin film memory device as claimed in claim 6, wherein said film of magnetic material covers the entire surface area of each of said memory conductors.

8. In a thin film memory device as claimed in claim 6, wherein each arm of each of said word conductors is of substantially rectangular cross section.

9. In a thin film memory device as claimed in claim 6, wherein said non-magnetic electrically conductive material comprises one of the group consisting of gold, silver and copper.

10. In a thin film memory device as claimed in claim 6, wherein said non-magnetic electrically conductive material comprises an alloy of at least two of the group consisting of gold, silver and copper.

11. In a thin film memory device comprising a matrix arrangement having a plurality of memory conductors, a plurality of word conductors positioned in determined relation to each other and each positioned in determined relation to the others, each of said memory conductors having a surface area, each of said memory conductors being in operative proximity with each of said word conductors at determined areas and each of said word conductors being in operative proximity with each of said memory conductors at said determined areas, and a plurality of magnet means each positioned in operative proximity with a corresponding one of said memory conductors and a corresponding one of said word conductors, at a determined area thereof, a film of magnetic material on the surface area of each of said memory conductors and a single film of non-magnetic electrically conductive material of less than 4 microns thickness on each of said memory conductors.

12. In a thin film memory device as claimed in claim 11, wherein said film of magnetic material covers the entire surface area of each of said memory conductors.

13. In a thin film memory device as claimed in claim 11, wherein said film of magnetic material covers less than the entire surface area of each of said memory conductors.

14. In a thin film memory device as claimed in claim 11, wherein said non-magnetic electrically conductive material comprises one of the group consisting of gold, silver and copper and aluminum.

15. In a thin film memory device as claimed in claim 11, wherein said non-magnetic electrically conductive material comprises an alloy of at least two of the group consisting of gold, silver and copper.

16. In a thin film memory device as claimed in claim 11, wherein each of said memory conductors is of substantially circular cross section and each of said word conductors is of substantially elongated U configuration having a pair of spaced arms and said memory conductors extend between the arms of each of said word conductors.

17. In a thin film memory device as claimed in claim 16, wherein said film of magnetic material covers the entire surface area of each of said memory conductors.

18. In a thin film memory device as claimed in claim 16, wherein each arm of each of said word conductors is of substantially rectangular cross section.

19. In a thin film memory device as claimed in claim 16, wherein said non-magnetic electrically conductive material comprises one of the group consisting of gold, silver and copper.

20. In a thin film memory device as claimed in claim 16, wherein said non-magnetic electrically conductive material comprises an alloy of at least two of the group consisting of gold, silver and copper.

References Cited

UNITED STATES PATENTS

| | | | |
|---|---|---|---|
| 3,060,411 | 10/1962 | Smith | 340—174 |
| 3,083,353 | 10/1963 | Bobeck | 340—174 |
| 3,133,271 | 5/1964 | Clemons | 340—174 |
| 3,264,619 | 8/1966 | Riseman et al. | 340—174 |
| 3,183,492 | 5/1965 | Chow et al. | 340—174 |
| 3,278,914 | 10/1966 | Rashleigh et al. | 340—174 |
| 3,350,180 | 10/1967 | Croll | 29—183.5 |
| 3,370,979 | 2/1968 | Schmeckenbecker | 340—174 X |

FOREIGN PATENTS

| | | |
|---|---|---|
| 876,454 | 8/1961 | Great Britain. |
| 1,160,887 | 1/1964 | Germany. |

STANLEY M. URYNOWICZ, Jr., Primary Examiner